United States Patent
Sharma et al.

(10) Patent No.: US 12,513,613 B2
(45) Date of Patent: Dec. 30, 2025

(54) RAN INTELLIGENT CONTROLLER (RIC) ENABLED DYNAMIC ACCESS AND MOBILITY MANAGEMENT FUNCTION (AMF) SELECTION

(71) Applicant: Radisys Corporation, Hillsboro, OR (US)

(72) Inventors: Rahul Sharma, Haryana (IN); Rajendra Prasad Kodaypak, Hillsboro, OR (US); Rajiv Gupta, Haryana (IN)

(73) Assignee: Radisys Corporation, Hillsboro, OR (US)

( * ) Notice: Subject to any disclaimer, the term of this patent is extended or adjusted under 35 U.S.C. 154(b) by 325 days.

(21) Appl. No.: 18/177,973

(22) Filed: Mar. 3, 2023

(65) Prior Publication Data

US 2024/0298252 A1    Sep. 5, 2024

(51) Int. Cl.
*H04W 48/18* (2009.01)
*H04W 84/04* (2009.01)

(52) U.S. Cl.
CPC .......... *H04W 48/18* (2013.01); *H04W 84/042* (2013.01)

(58) Field of Classification Search
CPC ............................ H04W 84/042; H04W 48/18
See application file for complete search history.

(56) References Cited

U.S. PATENT DOCUMENTS

| | | | |
|---|---|---|---|
| 11,558,920 B2 * | 1/2023 | Thantharate | H04W 48/18 |
| 2020/0383040 A1 * | 12/2020 | Young | H04W 88/18 |
| 2021/0219218 A1 * | 7/2021 | Chen | H04W 88/06 |
| 2023/0052699 A1 * | 2/2023 | Ninglekhu | H04W 60/04 |
| 2023/0063522 A1 * | 3/2023 | Vaknin | H04W 16/18 |
| 2023/0199632 A1 * | 6/2023 | Talebi | H04W 48/16 |
| | | | 455/434 |
| 2023/0199867 A1 * | 6/2023 | Song | H04W 92/12 |
| | | | 370/328 |
| 2023/0217362 A1 * | 7/2023 | Sharma | H04W 24/02 |
| | | | 370/329 |
| 2023/0239776 A1 * | 7/2023 | Song | H04W 48/18 |
| | | | 370/329 |
| 2025/0039820 A1 * | 1/2025 | Tiwari | H04W 48/18 |
| 2025/0113390 A1 * | 4/2025 | Tonesi | H04W 76/10 |
| 2025/0330909 A1 * | 10/2025 | Elshafie | H04W 52/0235 |

OTHER PUBLICATIONS

N. A. Mohammedali, T. Kanakis, M. O. Agyeman and A. Al-Sherbaz, "A Survey of Mobility Management as a Service in Real-Time Inter/Intra Slice Control," in IEEE Access, vol. 9, pp. 62533-62552, 2021. (Year: 2021).*

* cited by examiner

*Primary Examiner* — Asad M Nawaz
*Assistant Examiner* — Michael Wayne Maddox
(74) *Attorney, Agent, or Firm* — Stoel Rives LLP

(57) ABSTRACT

A near real time RAN intelligent controller (near-RT RIC) dynamically selects an AMF for a UE by receiving over an E2 interface with a CU an AMF selection request in connection with a UE; generating, in response to the AMF selection request, an AMF selection; and sending to the CU over the E2 interface the AMF selection to cause the CU to initiate NGAP signaling with an AMF identified in the AMF selection.

19 Claims, 11 Drawing Sheets

```
{
    policy_id: 1,
    scope: {
        cell_id: 2,
        PLMN_list: {Y, Z},
        slice_list: {3 4,6},
        tai_list: {TAI1, TAI2, TAI3},
        amf_region: {east}, /* region east, west, north, south etc */
        amf_set: [{
            set_id: B,
            AMF_pool: [
                {
                    pointer_id: 567,
                    weight: 60,
                    service: {all}
                },{
                    pointer_id: 568,
                    weight: 70,
                    service: {voice, RedCap, network-exposure-services}
                },{
                    pointer_id: 569,
                    weight: 30,
                    service: {voice, sms, location-based-services}
                }]
        },{
            set_id: C
            ....
        }]
    }
}
```

FIG. 6

RAN INTELLIGENT CONTROLLER (RIC) ENABLED DYNAMIC ACCESS AND MOBILITY MANAGEMENT FUNCTION (AMF) SELECTION

TECHNICAL FIELD

This application relates generally to 5G communication networks and, more particularly, to AMF selection.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station can include a RAN node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G node, NR node (also referred to as a next-generation Node B or g Node B (gNB)).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network (CN). Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT. As used herein, the term "NG-RAN node" (or simply NG-RAN) may refer to a RAN node that operates in an NR or 5G system and the term "E-UTRAN node" or the like may refer to a RAN node that operates in an LTE or 4G system (e.g., an eNB).

5G standalone (SA) architecture refers to the 5G network architecture that is independent of previous generation (4G) networks. It is a new architecture designed specifically for 5G and enables new capabilities such as ultra-low latency, high bandwidth, and large-scale device connections. In SA architecture, the 5G CN (5GC) is designed to support 5G services and applications without relying on any 4G components. This means that 5G devices can connect directly to the 55GC, providing more efficient and faster communication. The 5G SA architecture provides the foundation for new 5G use cases such as massive IoT, autonomous vehicles, virtual reality, and other next-generation applications and services. In 5G standalone (SA) architecture, a gNB provides the user plane and control plane termination towards the UE. The gNB manages resources of one or more cells in a geographical location. The gNB is connected by the N2 interface to the 5GC control plane via an access and mobility management function (AMF) and is connected by the N3 interface to the 5GC user plane via a user plane function (UPF).

A disaggregated 5G RAN refers to the architecture where the network components are separated and managed as independent entities. This architecture allows for greater flexibility, scalability, and innovation in the network. In a traditional 5G RAN, the baseband processing and radio functions are integrated into a single unit, known as a Baseband Unit (BBU). In a disaggregated 5G RAN, these functions are separated and distributed across the network, allowing for greater scalability and performance. The separation of functions in a disaggregated RAN enables network operators to mix and match different hardware and software components, optimizing the network to meet specific requirements and use cases. For example, network operators can select different vendors for baseband processing and radio functions, or use different hardware platforms to support different types of radio technologies. The disaggregated RAN architecture also enables the deployment of edge computing capabilities, allowing for more efficient processing of data close to the source and reducing latency. This architecture is critical for supporting emerging use cases such as massive IoT, augmented reality, and autonomous vehicles, which require low latency and high reliability. A disaggregated 5G RAN provides enhanced broadband wireless connectivity to a wide variety of 5G capable devices. A 5G RAN can be deployed using different frequency bands based on the different applications/services and location requirements. 5G services can be made available through public and private networks with network slicing enabled services isolation for greater flexibility, programmability, reliability, and quality of service.

An NG-RAN includes a radio unit (RU), a distributed unit (DU), and a central unit (CU), which in some embodiments may be implemented in a gNB (i.e., gNB-RU, gNB-DU, and gNB-CU). In general, the RU is the part of the network that is physically closest to the end user and is responsible for the radio transmission and reception. The RU is typically located on a tower or other high structure. The DU is the part of the network that is responsible for processing and forwarding data between the RU and the CU. The DU can be located either near the RU or centrally. The CU is the part of the network that is responsible for the control plane functions, such as managing the network and allocating resources. The CU is typically located in a central location, such as a data center.

In other embodiments, an NG-RAN may be implemented in an Open Radio Access Network (O-RAN). O-RAN is a disaggregated approach to deploying mobile fronthaul and midhaul networks built on cloud-native principles. O-RAN is an evolution of the NG-RAN architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN RU (O-RU), an O-RAN DU (O-DU), and an O-RAN CU (O-CU).

The latest 5G cellular networking standards support new use cases such as enhanced mobile broadband (eMBB), ultra-reliable low latency communications (URLLC), massive machine type communications (mMTC), cellular vehicle to anything (CV2X) communications and several others that will benefit the industrial revolution into the next decade. Different industry verticals will leverage 5G O-RAN enabled connectivity and its benefits in different ways. Mobile network operators will seek to deliver unique service-level agreements (SLAs) to their customers based on specific use cases and their end-to-end emerging cloud-native network infrastructure deployments while supporting interworking with other legacy and emerging access technologies.

A single RAN network function or group of such RAN functions in a given service area can be connected to a single AMF or multiple AMFs within an AMF pool. Due to the large scale and distributed nature of disaggregated 5G RAN network topologies, the traditional methods of core network functions selection using static node level configurations, tools and processes become ineffective.

SUMMARY OF THE DISCLOSURE

The present inventors recognize that CN selection (AMF), done intelligently, would accommodate increasing network complexity, different types of IoT use cases across industry verticals, and automation of networking, while facilitating reliability, scalability, and QoS. Intelligent selection of AMF is impacted by geographical location of cell sites, tracking and/or service areas they belong to, target applications, device capability and priority, operator provided prioritized services to end users in each location etc. There can be vertical and horizontal expansion of the network, which requires dynamic reconfiguration or changes in the selection logic across multiple nodes. To address these limitations, service impacts and operator overhead for multiple configurations, this disclosure describes a centralized logic for dynamic AMF selection and auto discovery of AMF network function.

The proposed embodiments enable RAN intelligent controller (RIC)-based dynamic AMF selection/reselection by considering the system attributes and end user service benefits. They provide for robust and optimal selection of an AMF with auto-discovery during the reselection process due to mobility triggers.

The disclosed network selection mechanisms automatically consider the effect of lifecycle management (LCM) operation of AMF instances triggered by the network orchestrator or from an operator. RIC-based network selection provides improved service assurance, avoids overload situations in cloud-native 5G core network designs, and prevents service-disrupting failure conditions. In addition, RIC-based network selection provides enhanced power savings and signaling reduction in the mobile network by use of resources with intelligent signaling routing and traffic capacity handling per PLMN/slice/TAC within the AMF pool environment.

RIC-based network selection also allows elastic network scale-in/scale-out during festival or game events/venue locations or high priority emergency services in a particular location or region. For instance, during a football game or festival season, an operator can add a new or used dedicated subset for the AMF/UPF/SMF server to handle certain service types in a particular location.

RIC-based network selection allows an operator to define and manage an AMF network function selection logic independent of the RAN network function suppliers to align better with their overall different services and network deployment needs. Operators may also continuously upgrade the AMF selection logic as their network expands, without impacting the RAN nodes and services. The disclosed embodiments avoid operator overhead of managing AMF network function selection at each E2 node.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 6 is an example data structure showing an AMF selection priority policy set.

DETAILED DESCRIPTION OF EMBODIMENTS

Figure 1:
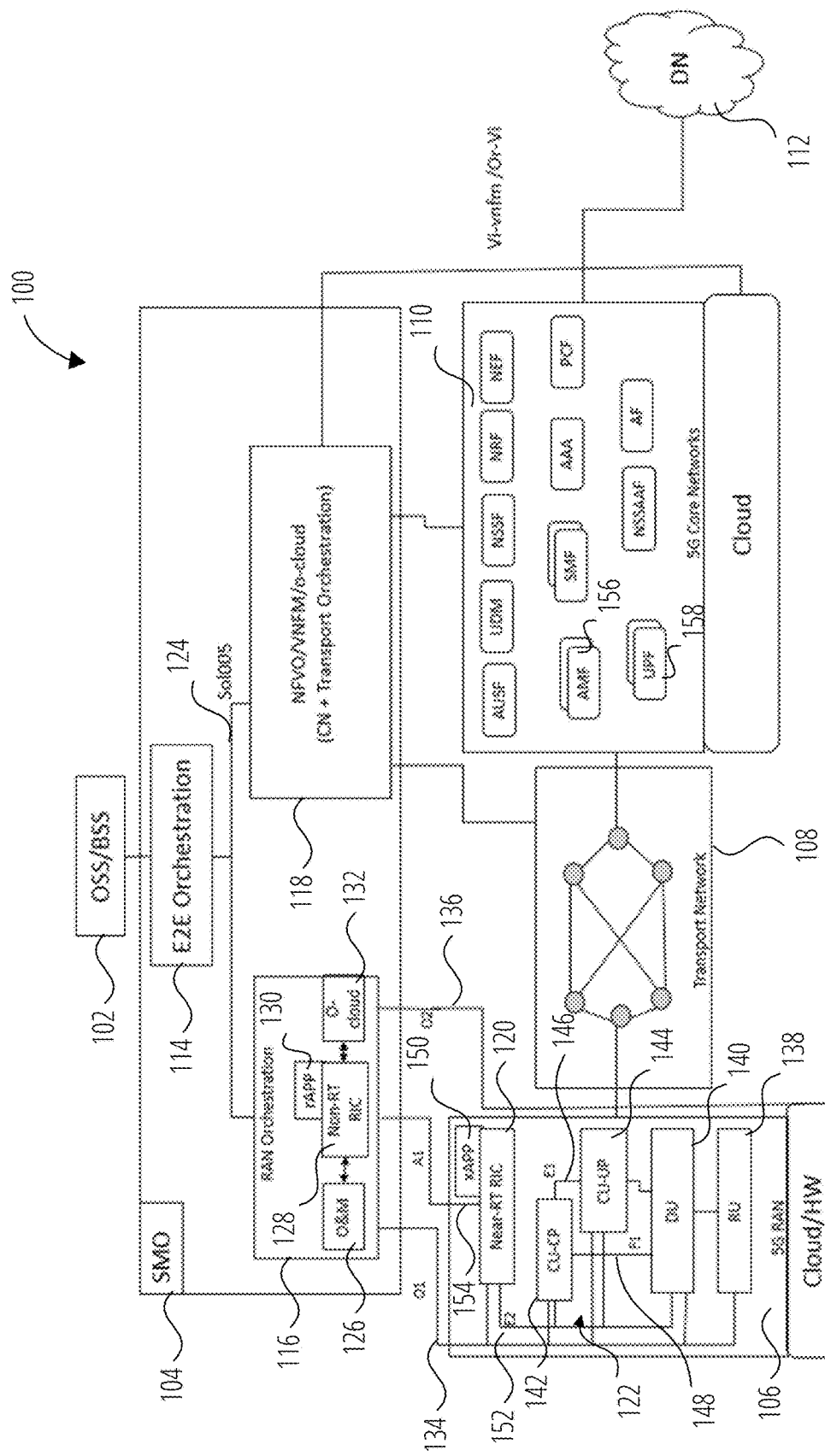
FIG. 1 is a block diagram of a 5G operations, administration, and maintenance (OAM)/orchestration architecture in accordance with one embodiment.

FIG. 1 shows an example of a 5G OAM/orchestration architecture 100. 5G OAM/orchestration architecture 100 comprises an operations support system (OSS) and business support system (BSS) (OSS/BSS) 102; service management and orchestration (SMO) 104; a 5G RAN 106; a transport network 108; a 5GC 110; and a data network (DN) 112.

With reference to OSS/BSS 102, OSS refers to the technology and systems that support the day-to-day operations of a telecommunication network, including network management, service management, and service assurance. It helps to monitor and manage the technical aspects of the network, such as network performance, capacity, and availability. BSS, on the other hand, is focused on the business side of the network and supports the operations of customer management, billing, and revenue management. It helps to manage customer interactions, service orders, billing, and revenue collection. OSS/BSS 102 provide(s) a comprehensive solution for managing and operating a telecommunication network, enabling operators to deliver reliable and cost-effective services to their customers.

SMO 104 is a software component in 5G OAM/orchestration architecture 100 responsible for managing and controlling the services and resources provided by the network to the users. SMO 104 monitors the quality of service and ensures that the network is delivering the required services efficiently and effectively. It also provides real-time insights into network performance, enabling the network operator to make informed decisions about resource allocation and network optimization. SMO 104 is a unified service management and orchestration layer that manages a service provider's 5G RAN, transport, and 5GC infrastructure equipment from multiple vendors. SMO 104 includes end-to-end (E2E) orchestration 114, RAN orchestration 116, and CN+transport orchestration 118.

E2E orchestration 114 refers to the automated management and coordination of all components and services in a 5G network from end-to-end. For instance, E2E orchestration 114 entails the real-time monitoring and management of network resources, service performance, and network security. For instance, the orchestration process involves the real-time monitoring of network performance, the allocation of network resources, and the automated resolution of network issues. The aim is to provide a seamless, efficient, and secure network environment for 5G services and applications. More specifically, E2E orchestration 114 involves the coordination of various functions and components in a 5G network, including 5G RAN 106, 5GC 110, a near real time (near-RT) RIC 120, and a CU 122. E2E orchestration 114 in SMO 104 enables 5G use cases such as ultra-low latency, high-speed connectivity, and large-scale device connections. It provides network operators with the visibility and control to optimize network performance, reduce downtime, and improve overall network efficiency.

E2E orchestration 114 is communicatively coupled to RAN orchestration 116 and CN+transport orchestration 118 via a Sol005 interface 124. RAN orchestration 116 includes operations and maintenance (O&M) 126, non-RT RIC 128 that hosts rAPP 130, and O-cloud 132.

O&M 126 refers to the processes and activities involved in monitoring, managing, and maintaining network performance, security, and availability, as well as the resolution of network issues and outages. It also involves the maintenance and upgrade of network components and services to ensure that the RAN infrastructure is up-to-date and capable of meeting the evolving needs of 5G services and applications. O&M 126 processes in RAN orchestration 116 are automated, with the use of advanced network management tools and technologies that provide real-time visibility and control of network performance and security. This enables network operators to quickly identify and resolve network issues, optimize network performance, and ensure that the RAN infrastructure is always operating at its best.

Non-RT RIC 128 provides network intelligence and control functions, but operates outside of real-time constraints. Non-RT RIC 128 works in conjunction with near-RT RIC 120 to provide comprehensive network intelligence and control capabilities. Non-RT RIC 128 hosts rAPPs 130, which includes specialized microservices that do not require real-time processing, such as network planning, configuration management, and performance analysis. It provides network operators with valuable insights into network performance, resource utilization, and security, and enables them to make informed decisions about network configuration and resource allocation. Non-RT RIC 128 also terminates an O1 interface 134, which connects to every other RAN component for management and orchestration of network functionalities.

O-cloud 132 is a cloud computing platform made up of the physical infrastructure nodes using the O-RAN architecture. It also creates and hosts the various virtual network functions (VNFs) used by the RICs and other infrastructure elements. In some embodiments, as defined in O-RAN's SMO framework, a network's O-CU functions, O-DU functions, and near-RT RIC 120 are defined as cloud-native virtualized functions which run on a cloud infrastructure referred to as O-cloud 132. Non-RT RIC 128 and SMO 104 connect to O-cloud 132 though an O2 interface 136.

In some embodiments, NFV may be utilized to virtualize any or all of the above-described network node functions via executable instructions stored in one or more computer-readable storage mediums (described in further detail below). A logical instantiation of 5GC 110 may be referred to as a network slice, and a logical instantiation of a portion of 5GC 110 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more components/functions.

CN+transport orchestration 118 may include an NFVO, VNFM, or O-cloud. An NFVO is responsible for automating the deployment, configuration, and management of VNFs in a 5G network. It works in collaboration with other SMO components such as the virtualized infrastructure manager (VIM) and the VNF manager (VNFM) to ensure that the VNFs are deployed and configured correctly and operate efficiently. The NFVO provides network operators with the visibility and control they need to manage the deployment and configuration of VNFs in their 5G networks. It also provides real-time monitoring and management of VNF performance, enabling network operators to quickly identify and resolve any issues that may arise. The VNFM is responsible for the lifecycle management of VNFs, including their deployment, configuration, monitoring, and decommissioning.

5G RAN 106 includes an RU 138, a DU 140, and a CU 122. CU 122 includes a CU-CP 142 and a CU-CP 144, which are connected via an E1 interface 146. CU-CP 144 is connected to DU 140 via an F1 interface 148. In some embodiments, RU 138, DU 140, and CU 122 may be implemented as a gNB. For instance, a gNB-DU is connected to a gNB-CU via F1 interface 148. A gNB-CU may be operated by a server that is located in 5G RAN 106 (not shown) or by a server pool. A gNB-DU may be located with one or more gNB-RUs. In other embodiments, RU 138, DU 140, and CU 122 may be implemented as an O-RAN.

5G RAN 106 also includes near-RT RIC 120. Near-RT RIC 120 hosts an xAPP 150, which in some examples configure near-RT RIC 120 to optimize radio spectrum efficiency and provide real-time radio network information and intelligence to 5GC 110. This enables the 5G network to make informed and automated decisions about network resources and configurations in real-time. Near-RT RIC 120 communicates via an E2 interface 152 with CU 122 and DU 140 to gather information about the network conditions and performance. It then processes this information and provides it to non-RT RIC 128 via an A1 interface 154, allowing the network to make real-time adjustments and optimizations to the network configuration.

5GC 110 has VNFs or cloud-native network functions (CNFs) that dynamically scale in and scale out within a given site (local/regional) and/or across the sites (regional pools with borders). In the example of FIG. 1, 5GC 110 includes a pool of AMFs 156, a pool of UPFs 158, a session management function (SMF), an authentication server function (AUSF), a network exposure function (NEF), a unified data management (UDM), a unified data repository (UDR), a short message service function (SMSF), a non-3GPP interworking function (N3IWF), a policy control function (PCF), an NF repository function (NRF), a network slice selection function (NSSF), an application function (AF), or other 5G core network functions. A charging function (CHF) introduced in the 5G system architecture allows charging services to be offered in connection with OSS/BSS 102.

Data network 112 may include an application server offering applications that use IP bearer resources with 5GC 110 (e.g., UMTS PS domain, LTE PS data services, etc.). The application server can also be configured to support one or more communication services (e.g., VoIP sessions, PTT sessions, group communication sessions, social networking services, etc.) for a UE.

As explained with reference to FIG. 2, performing static network configuration and selection of a default AMF at the NG-RAN E2 node (e.g., gNB-CU) is not effective in a disaggregated O-RAN network. Such a configuration within the gNB-CU network function has localized scope, with limited intelligence and lack of proximity awareness to yield the best results for accurate selection in the first instance.

Figure 2:
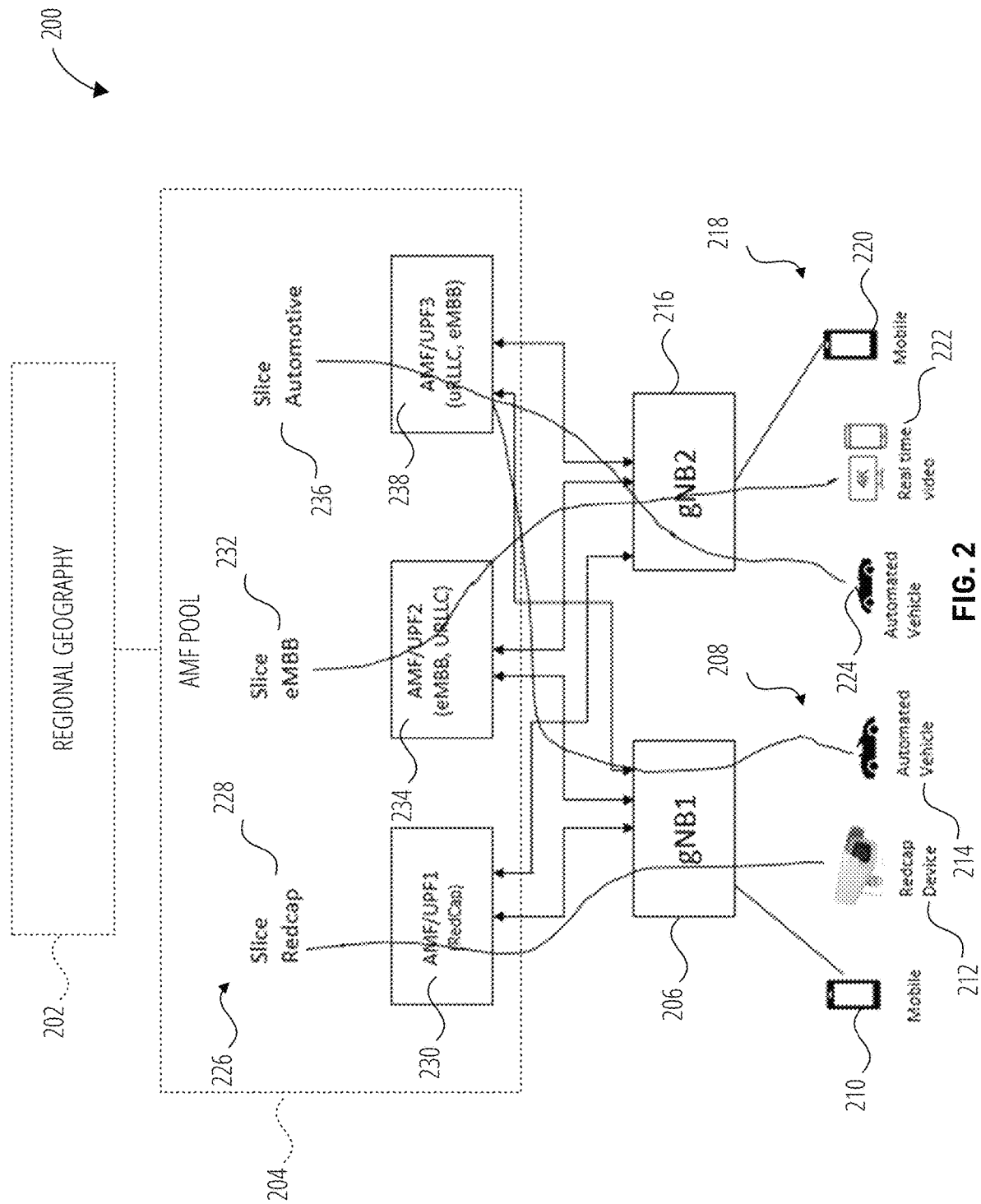
FIG. 2 is a block diagram of a static AMF network configuration in accordance with one embodiment.

FIG. 2 shows an example network configuration 200 employing a conventional, static AMF selection. Within the same PLMN 202, there is a pool of AMFs 204, with each AMF having a different capacity handling and services capability. In this example, a first gNB 206 supports cell coverage for a first group of UEs 208 including mobile smart devices 210, reduced capability (RedCap) devices 212, and autonomous vehicles 214. A second gNB 216 supports cell coverage for a second group of UEs 218 including mobile smart devices 220, real time video 222, and autonomous vehicles 224.

Multiple network slices 226 have been allocated for all the UE devices. For example, a first slice 228 corresponding to a first AMF/UPF 230 is allocated for RedCap devices 212, a second slice 232 corresponding to a second AMF/UPF 234 is allocated for enhanced mobile broad band (eMBB) and ultra-reliable low latency communications (URLLC) devices such as real time video 222, and a third slice 236 corresponding to a third AMF/UPF 238 is allocated for eMBB and URLLC automotive devices such as autonomous vehicles 214 and 224.

A gNB's static configuration and selection of a default AMF during initial RRC establishment procedures may cause inordinate signaling load in the network nodes, unnecessary NAS layer signaling/redirection, degraded quality of service (QOS), or imbalance in resources utilization. Topology of network nodes plays a role in reducing the call setup time and end user experience. For instance, improper AMF selection can cause failure of calls or redirection to other AMFs, which increases the signaling load as well as call setup times. There is also operator overhead to define and maintain different types of configurations with targeted RAN expansion.

In contrast to a static configuration, in live 5G networks there can be planned and unplanned operations along with variable capacity/traffic loading and resulting events which may affect AMF/SMF/UPF network functions. The selection of such 5GC functions has a direct impact on the services offered as well as the end user experience. Also, there can be addition of new AMFs/PLMN IDs/slices for intelligent selection or removal due to failure of network nodes in data centers. Thus, dynamic behavior of network functions or operator demands could be considered while performing intelligent selection of such functions. The following table provides an overview of other factors affecting network selection.

TABLE 1

| | |
|---|---|
| Operational Impact | Lifecycle Operation: Instantiation of new 5GC network nodes, e.g., new AMF for a particular slice along with its other network node; SW upgrade procedure; termination of AMF due to maintenance; manual/auto-healing; AMF pooling design |
| | Configuration change, network router/firewall rule updating |
| | Failure in AMF node or other peer 5GC network node which may impact the call processing logic handled by an AMF node |
| | Overload conditions |
| | Failure in data center/site/power or disaster situations |
| Deployment Aspects | Supported slice instance by AMF |
| | Supported 5GS-TAC by AMF |
| | Supported service by AMF (e.g., IoT-RedCap, URLLC, NTN, TSN, LBS, etc.) |
| | Private network (SNPN/PNI-NPN) or public network |
| | Capacity of AMF |
| | CN and RAN network topology |
| UE | UE home PLMN |
| | Target applications/service request |
| | UE category, capability and priority |
| | IP or non-IP data connectivity |

Figure 3:
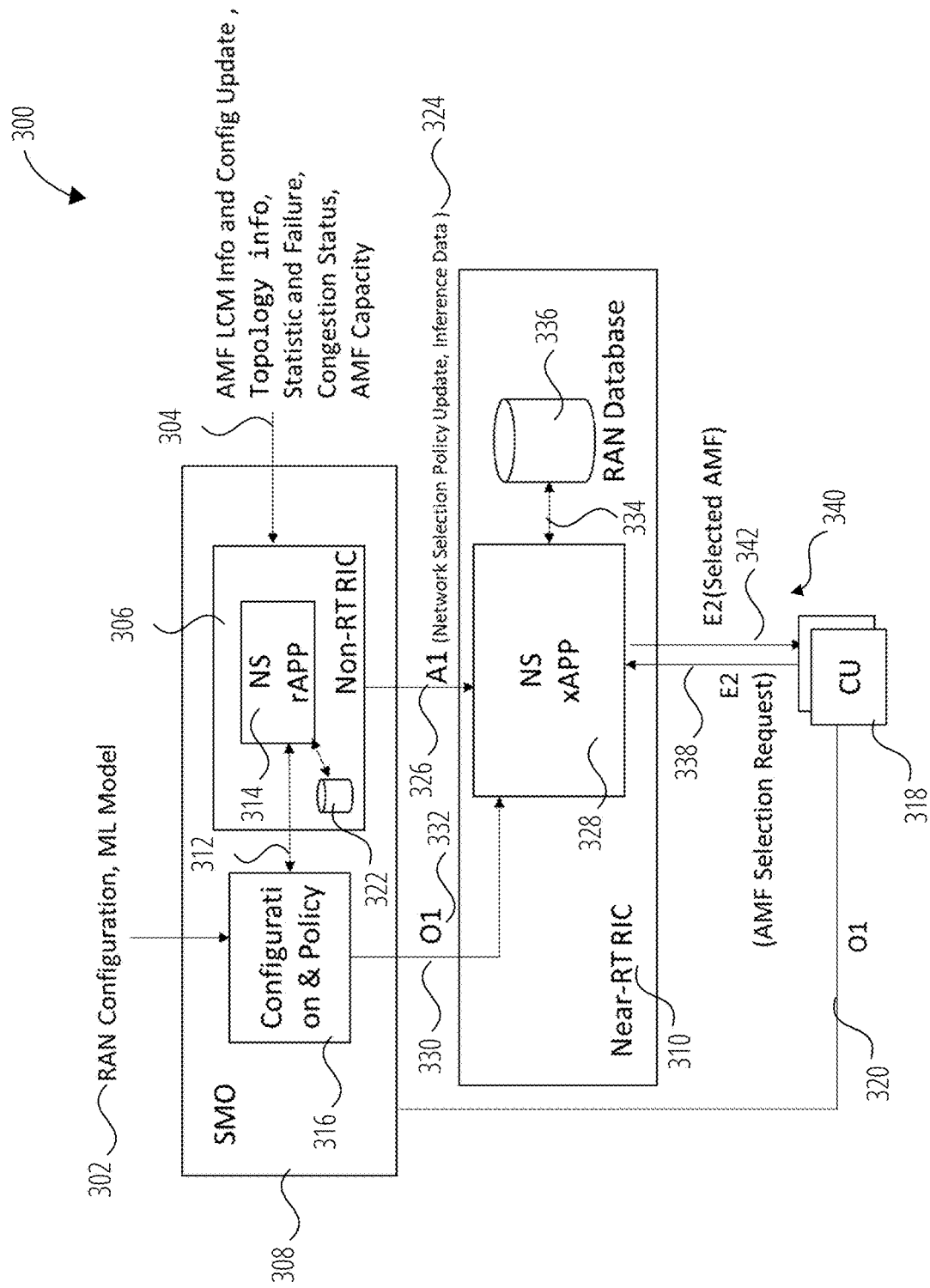
FIG. 3 is a block diagram of a RIC system in accordance with one embodiment.

FIG. 3 shows an example of a RIC system 300 implementing an enhanced AMF network selection function. In terms of advantages over static AMF selection, RAN and CN statistics along with congestion events for network selection are available at RIC system 300. RIC system 300 has a computation capability platform to perform decisions based on an algorithm, e.g., artificial intelligence/machine learning (AI/ML), considering a RAN configuration, ML model 302 and input information 304. RIC system 300 makes decisions dynamically according to the variation of signaling and data traffic capacity associated with a variety of devices including their categories, priorities, slice support, and the like to select the optimal core network functions. RIC system 300 uses network topology to make optimistic selection of an AMF among an AMF set/group serving end user devices/customers within a specific zone, cluster, closed-group service area, site and across the site, along with other criteria such as call setup time, network latency, bandwidth, service assurance, and the like. RIC system 300 also performs resource management like power saving, as it has a global view of gNBs and AMFs. It has improved management in terms of cost, capacity, and performance along with availability and reliability. RIC system 300 can handle the dynamic policy updates and resizing of the network.

RIC system 300 is divided into two components: non-RT RIC 306 in SMO 308 and near-RT RIC 310. SMO 308 receives a RAN configuration, ML model 302 from a network operator. In some embodiments, RAN configuration, ML model 302 includes per cell configuration parameters such as supported PLMNs, supported network slices, supported TAI, supported services (e.g., IoT, URLLC), and AMF endpoint configuration(s) including each AMF's globally unique AMF ID (GUAMI), AMF endpoint profile, PLMN list, slice list, and TAI list. In some embodiments, the network operator provides RAN configuration, ML model 302 trained on time-series data of ML features comprising N2 signaling load, N3 interface traffic, network slice user distribution AMF capacity utilization, and AMF reroute of users.

Based on RAN configuration, ML model 302 and information 312 (explained below) exchanged with a network selection (NS) rAPP 314 of non-RT RIC 306, SMO 308 generates configuration and policy 316. For example, configuration and policy 316 may include a policy of balancing a load per each AMF. In another example, configuration and policy 316 may include a configuration derived from RAN configuration, ML model 302, RAN CU 318 KPI from an O1 interface 320, and a policy of increasing the load on each AMF during a known maintenance operation when some AMFs are taken out of the pool. Another example policy may be to select certain services for a subset of AMFs in the pool that support the given service, e.g., autonomous vehicles, that have been tagged as supporting that type of capability. And another policy would be to allow all AMFs in the pool to provide service for autonomous vehicles. In practice, there are many potential policies.

Information 312 includes RAN-supported configuration information such as PLMN, network slice, and TAI supported by a RAN along with policy rule or priority (if any) while performing network selection. Information 312 is stored as data 322 so that non-RT RIC 306 may use it when it updates policies based on input information 304 representing the aforementioned factors affecting network selection. For instance, input information 304 includes the following information from standard interfaces, which is information collected by SMO 308 from RAN and AMF (e.g., statistics and alarm), and collected information during lifecycle management and update from OSS/BSS 102 (FIG. 1).

TABLE 2

| | |
|---|---|
| AMF LCM Information and Configuration Update | LCM event and configuration update events. Example of LCM events that can impact the network selection: AMF upgrade, auto healing or manual healing, teardown operation, new AMF instantiation. Configuration update event: enabling/disabling of network slice or operation state update. LCM events will enable the addition/removal of AMF from AMF selection priority policy set automatically based on the type of event/operation. |
| Topology Information | Example: Topology map view with cost info in terms of latency and capacity. Topology information is used to define AMF selection policy priority based on cost information, zone cluster/site and geo-redundancy. |
| Statistics and Failure Events | RAN, AMF, SMF, and UPF statistics; failure and redirection events. Counter and failure events are used to estimate the signaling load and measure the success rate which further can be used to define the priority for an AMF selection. Examples: RAN counter - call failure KPI, AMF capacity utilization, AMF reroute of users. AMF counter - call setup time, mean number of registered state subscribers per PLMN/slice, total number of successful service requests, registration request attempts, and registration successes. |
| Congestion Status | CN overload status, transport overload status. Example: AMF overload, slice overload, physical/virtual transport overload (e.g., transport utilization of more than 80%). Similarly, congestion status can be used to control or balance the signaling load across AMFs in a given region. |
| AMF Capability | Capacity, PLMN supported, slices supported, tracking area code (TAC) supported, pool ID, QoS policies, and services supported. Example: Relative capacity of AMF in an AMF pool set, AMF supported PLMNs, slices and TACs, AMF service supported (e.g., IoT, URLLC). RIC will use the input to make AMF selection priority policy set to: Distribute the calls based on AMF capacity. Distribute the calls based on the service/PLMN/slices supported by AMF, e.g., RedCap device's call shall be distributed to AMF supporting RedCap feature, similarly to other IoT use cases. Examples of AMF service capability lists: location-based service, RedCap, network-exposure-services delivery, short-message-services, reachability after sleep mode (network exposure services), restrict |

TABLE 2-continued tracking area in a region (geographical-access-
restrictions) for services, QoS enforcements in a
region based on PLMN/slices.

NS rAPP 314 provides a network selection policy update and inference data 324 over an A1 interface 326 with NS xAPP 328. Network selection policy update and inference data 324 are based on AI/ML computation and includes information such as priority of AMF per network slice and service type per RAN sites for different times of day, days of the week and special days of the year (e.g., holiday events with finer time granularity). The policy includes information on how these priorities would be affected by dynamic AMF capacity updates and RAN load. In some embodiments, network selection policy update and inference data 324 includes an AMF selection priority policy set (see, e.g., FIG. 6).

NS xAPP 328 also receives AMF configuration information 330 over an O1 interface 332 with RAN orchestration 116 (FIG. 1). AMF configuration information 330 contains the AMF configuration list, and each list has a globally unique AMF ID (GUAMI), AMF endpoint profile, PLMN list, slice list, and TAI list.

CU 318 also includes O1 interface 320 with SMO 308. CU 318 uses O1 interface 320 to update RAN statistics, overload status received from AMF, and AMF capacity information received over N2 interface.

NS xAPP 328 also exchanges information 334 with a RAN database 336. In some embodiments, information 334 includes AMF endpoint information (e.g., AMF configuration information 330 received over O1 interface 332) and network selection policy update and inference data 324 received over A1 interface 326. NS xAPP 328 can retrieve information 334 from RAN database 336 when CU 318 sends an E2 request command 338 for an AMF selection over an E2 interface 340 with NS xAPP 328. E2 interface 340 is an open interface between near-RT RIC 310 and DUs, and CUs, in 5G. It runs on top of the SCTP protocol over IP. E2 interface 340 supports two logical protocols, i.e., E2 application protocol (E2AP) and E2 service model (E2SM). E2AP messages can embed different E2 service models, which implement functionalities related to RAN metrics and RAN control. The E2 service model includes E2 Report, E2 Insert, E2 Control and E2 Policy. The E2 service model can be used for three applications: Key Performance Matrix (KPM), Network Interfaces (NIs) and RAN Control (RC).

CU 318 provides the following network parameters information in an E2 request command 338 for AMF selection: selected PLMN ID by UE; NSSAI list of UE; registered AMF; UE capability, e.g., RedCap UE, integrated access and backhaul (IAB) indication; establishment cause; cell ID (NR-CGI); 5GS-TAC; service area; and other network parameters.

Near-RT RIC 310 then selects an AMF based on network selection policy update and inference data 324, AMF configuration information 330 stored in RAN database 336, and UE request and connection parameters of E2 request command 338. Near-RT RIC 310 then provides E2 response 342 selecting an AMF for a device/UE using AI/ML. Near-RT RIC 310 has a wider and more centralized scope across the different RAN network functions (RU/DU/CU).

Figure 4:
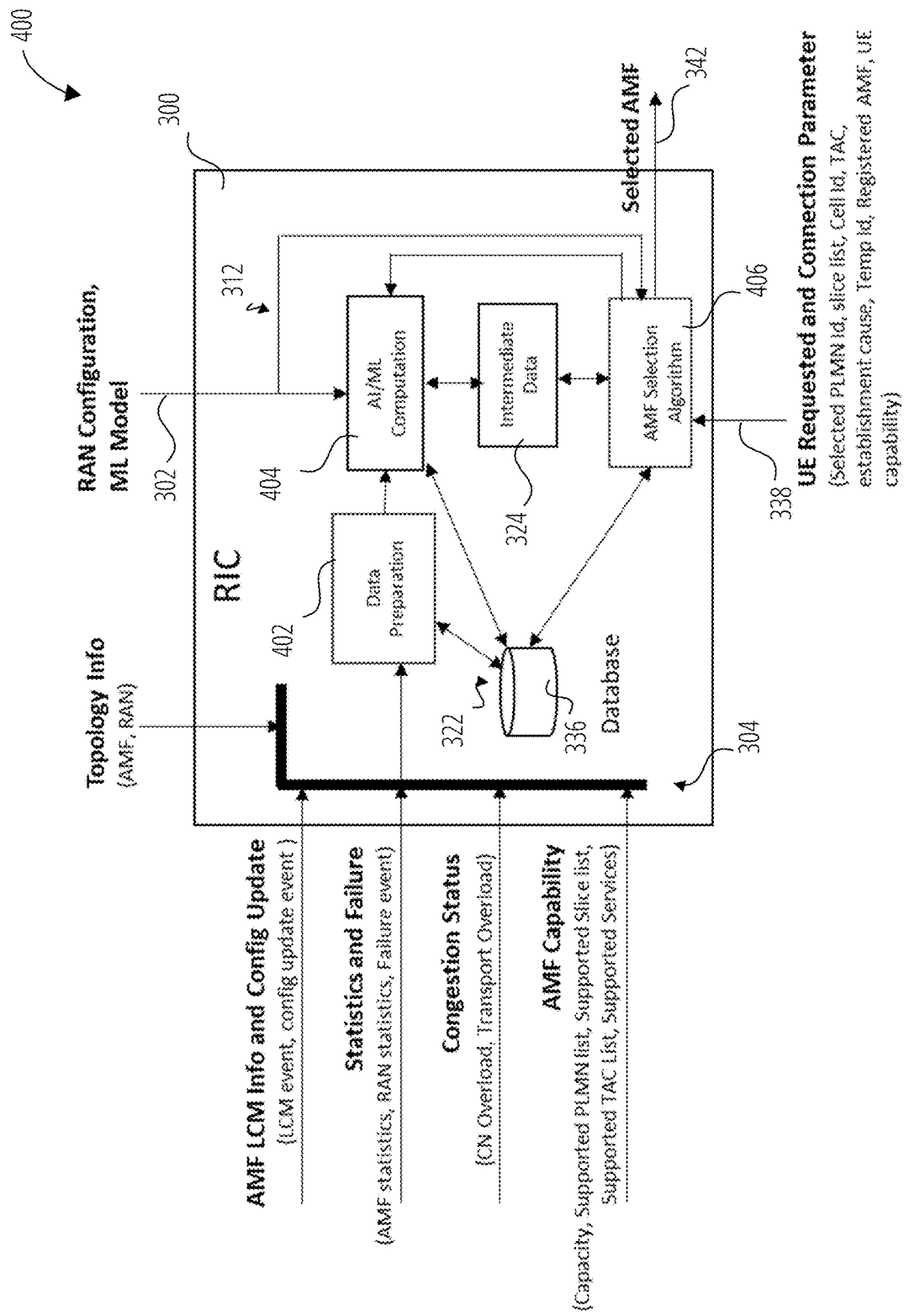
FIG. 4 is a block diagram the RIC system of FIG. 3, showing data flows and processing tasks in accordance with one embodiment.
Figure 5:
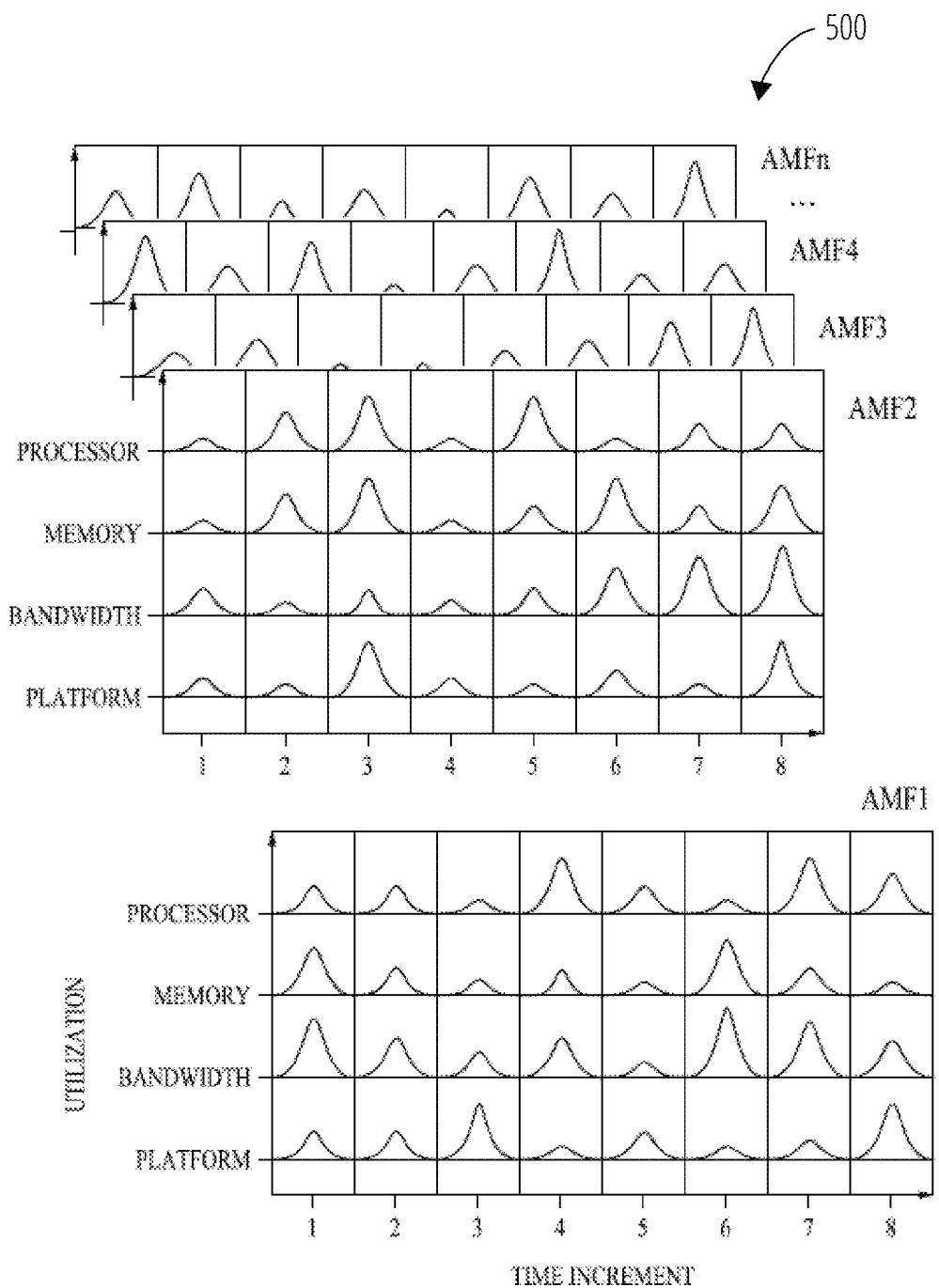
FIG. 5 are a set of graphs representing AMF utilization for a pool of AMFs in accordance with one embodiment.

FIG. 4 shows in greater detail an example of data flows and processing tasks 400 in RIC system 300. As explained above, RIC system 300 enables a RAN network to make more intelligent decisions. Data preparation 402 entails taking input data from different standardized interfaces including SMO, O1, A1, E2, and NWDAF. The data is stored and formatted for first AI/ML computation 404 performed by non-RT RIC 306 (FIG. 3), as described previously. An output of first AI/ML computation 404 is network selection policy update and inference data 324 (also referred to as intermediate data). Network selection policy update and inference data 324 is provided to an AMF selection algorithm 406 in near-RT RIC 310 (FIG. 3). Near-RT RIC 310 also receives data over O1 interface 332 and storage, E2 request command 338, and other inputs. The output of the AMF selection algorithm 406 is E2 response 342 including the AMF selection FIG. 5 shows a graphical example of AMF dataset 500, which in some embodiments corresponds to information included in input 304 (FIG. 3 and FIG. 4). In AMF dataset 500, a pool of AMFs is shown as AMF1 through AMFn. Each AMF has its utilization metrics shown as a function of time. An AI/ML computation may use this historical information as an input and apply an ML model to develop a policy update that effectively dynamically balances the AMF loading. For instance, if a certain AMF within an AMF set/group serving a regional pool appears to be overloaded at a repeated time (e.g., due to IoT devices all waking up from their sleep mode and broadcasting at a specific time with certain periodicity), then a policy could be developed to predict this usage and automatically balance the load.

FIG. 6 shows an example AMF selection priority policy set 600. AMF selection priority policy set 600 includes a policy ID 602 and a scope field 604. Nested under scope field 604 are a cell ID 606, a PLMN list 608, a slice list 610, a TAI list 612, an AMF region 614, and an AMF set 616. Nested under AMF set 616 are a first set ID 618 and a second set ID 620. First set ID 618 includes an AMF pool 622 with three entries, each entry with a pointer ID 624, a weight 626, and a service 628. In this example, weight 626 is an indication of a current or average resource utilization (see, e.g., FIG. 5) that is dynamically or periodically calculated for a corresponding AMF (denoted by its pointer ID 624) in given AMF serving region-set.

Skilled persons will appreciate that there are other data structures that could be used for signaling an AMF selection priority policy set.

Figure 7:
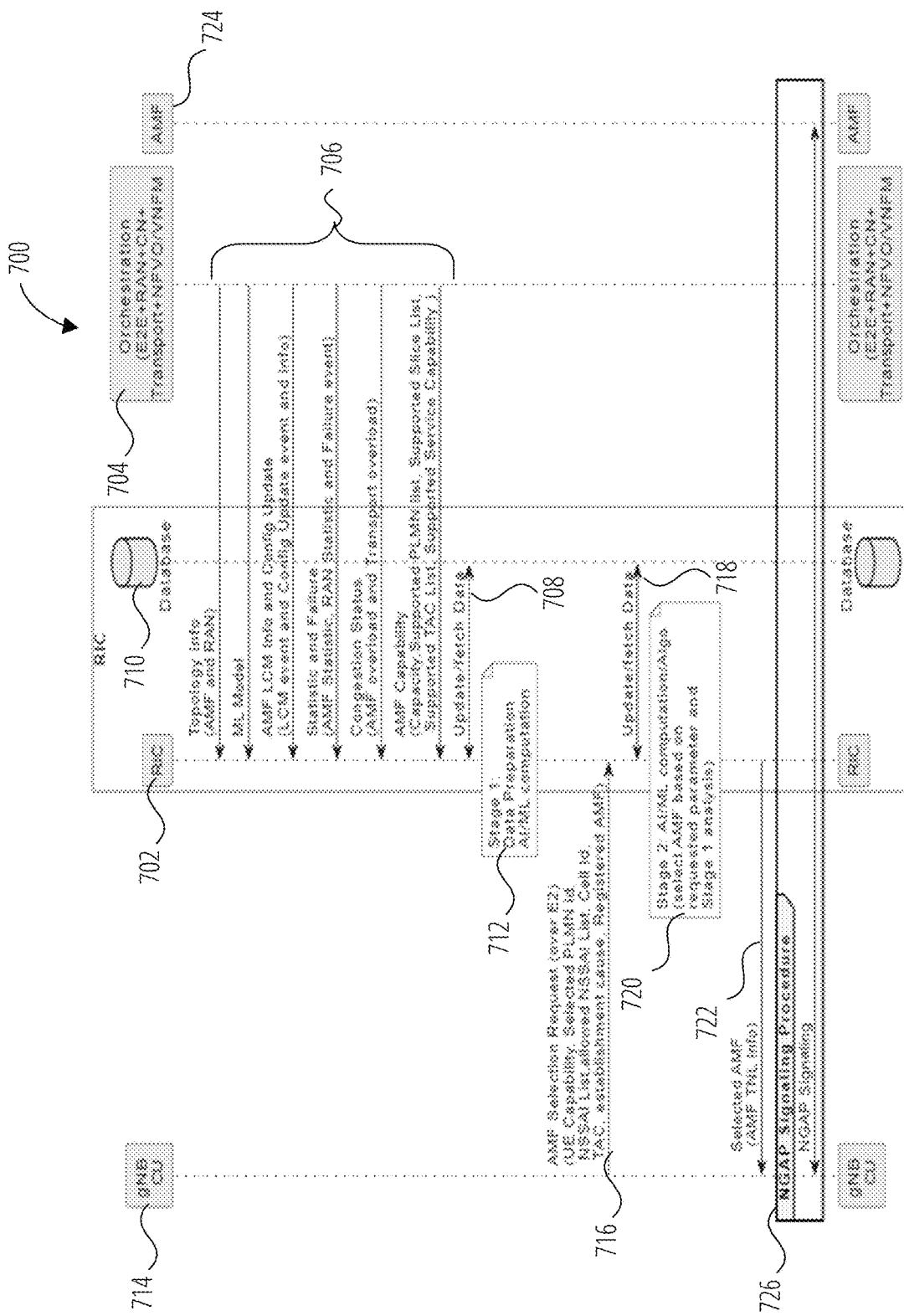
FIG. 7 is a message sequence diagram in accordance with one embodiment.

FIG. 7 shows a message sequence for a process 700 of dynamic AMF selection. RIC 702 initially receives from orchestration 704 input data 706, as described previously. Input data 706 is included in an update/fetch data 708 to database 710.

Next, RIC 702 performs a first stage processing, which entails data preparation and policy computation 712. As explained previously, these tasks are not time sensitive and can therefore be performed by a non-RT RIC.

When a CU 714 sends an E2 request and network parameters 716 to RIC 702 (e.g., a near-RT RIC), RIC 702 performs an update/fetch data 718 (e.g., information 334, FIG. 3) from database 710 (e.g., RAN database 336). As explained previously, RIC 702 would then perform a second stage processing AMF selection 720.

After AMF selection 720, RIC 702 sends to CU 714 an E2 response 722 including transport network layer (TNL) information. Finally, CU 714 and a selected AMF 724 perform NG application protocol (NGAP) signaling 726 over an NG interface (not shown) to complete the AMF selection process.

Figure 8A:
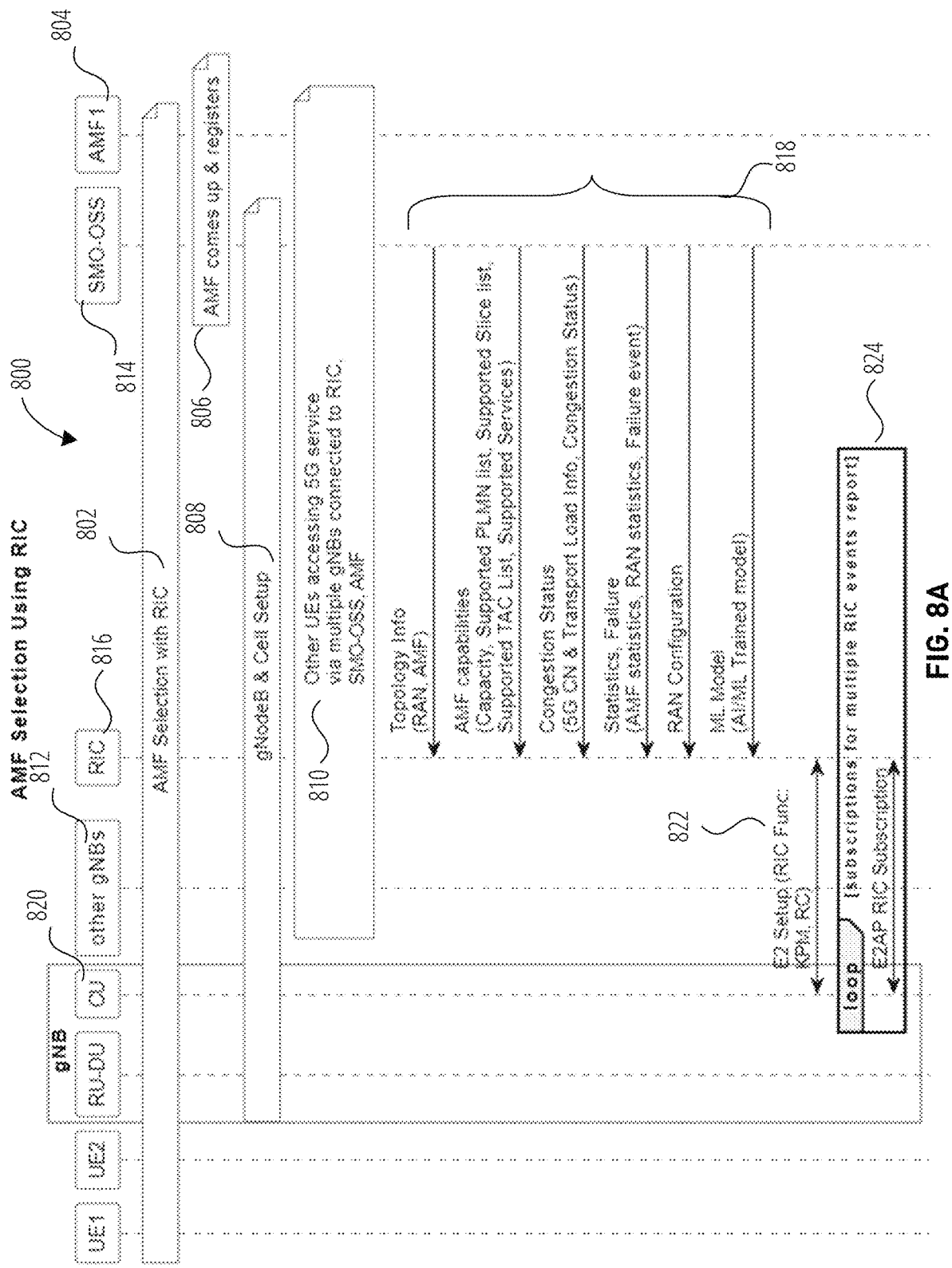
FIG. 8A and FIG. 8B are, respectively, upper and lower portions of a message sequence diagram in accordance with one embodiment.
Figure 8B:
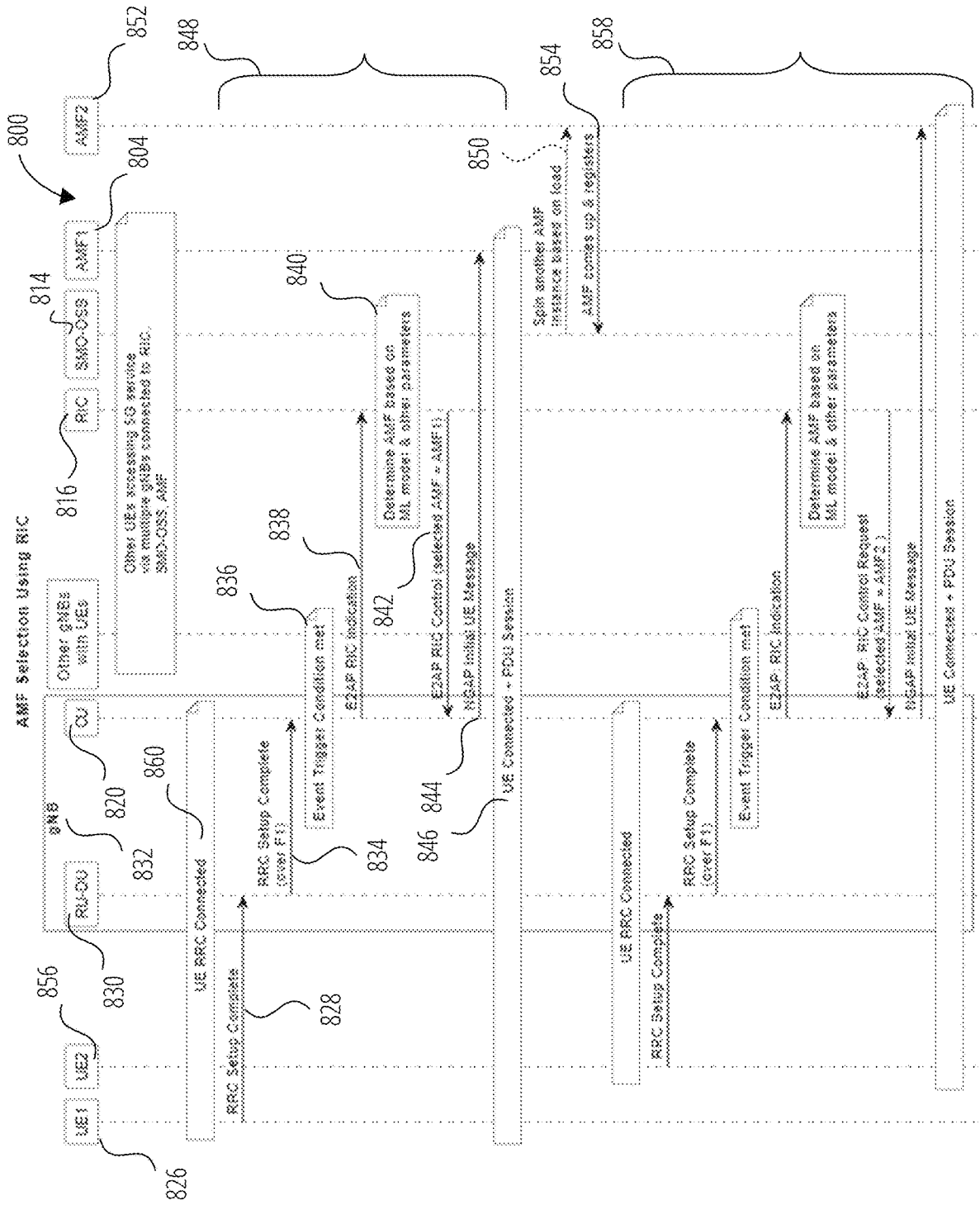

FIG. 8A and FIG. 8B show another process 800 for RIC-based AMF network function selection. Initially, FIG. 8A shows process 800 has started when there has been an AMF selection with RIC 802, the AMF (e.g., first AMF 804) comes up and registers 806, gNB and cell setup 808 is established, and other UEs are accessing 5G service 810 via other gNBs 812. As explained previously. SMO-OSS 814 provides to RIC 816 input data 818. A CU 820 establishes E2AP setup procedure 822 with RIC 816 to set up a signaling connection between CU 820 and RIC 816. A loop 824 of E2AP RIC subscription procedures are established on CU 820 to report for multiple RIC events. An NS xAPP in RIC 816 will trigger the subscription to report a new UE request and connection information for AMF selection.

FIG. 8B then shows a first UE 826 initiating an RRC setup procedure with CU 820, sending RRC setup complete 828 to RU-DU 830 of gNB 832, which sends RRC setup complete 834 (over F1) to CU 820. CU 820 then detects that an event trigger condition is met 836 and sends to RIC 816 an E2AP RIC indication 838 message with a new insert indication for the UE request and connection parameter. The E2AP report indication in O-RAN specifications includes an insert action for UE request and connection information. Specifically, E2AP Report Indication is specified in O-RAN.WG3.E2AP-v02.03, and so in the current embodiment a new insert service is implemented for E2AP RIC indication 838.

RIC 816 then determines AMF 840 based on the network policy and UE request and connection parameters, discussed previously. RIC 816 then responds to CU 820 with E2AP RIC control request 842 including a control action as a selected AMF (e.g., first AMF 804). For instance, a control request is specified in O-RAN.WG3.E2AP-v02.03, and so in the current embodiment a new control action is implemented for E2AP RIC control request 842.

Next, CU 820 provides to first AMF 804 an NGAP initial UE message 844. At this point, first UE 826 is connected 846 and can initiate a PDU session. This completes first UE connection process 848.

When SMO-OSS 814 recognizes there is a load on first AMF 804 that is sufficient for initiating another AMF instance, SMO-OSS 814 signals 850 a second AMF 852. Second AMF 852 comes up and registers 854 with SMO-OSS 814. Now, a second UE 856, RU-DU 830, CU 820, RIC 816, and second AMF 852 can complete a second UE connection process 858 that is substantially similar to first UE connection process 848.

To ensure the previously described processes are secure, fault, configuration, accounting, performance and security (FCAPS) related configuration, performance management, fault management (alarms/traps), and other critical events associated with the networking domains are not to be provided to unauthorized services. Authentication is performed using the strong protocol/algorithm and using centralized authentication service. The exchange of network-specific information is made using strong encrypted protocols. Near-RT RIC stores the network information data in a local database per region or PLMN or NPN or network slice to maintain the privacy of data across the operator/vendor community. In multi-operator (MORAN, MOCN) deployment, the RAN master operator does not process the near-RT RIC operator data of others without the consent of the individual operator or without trusted partnership agreements in place.

Figure 9:
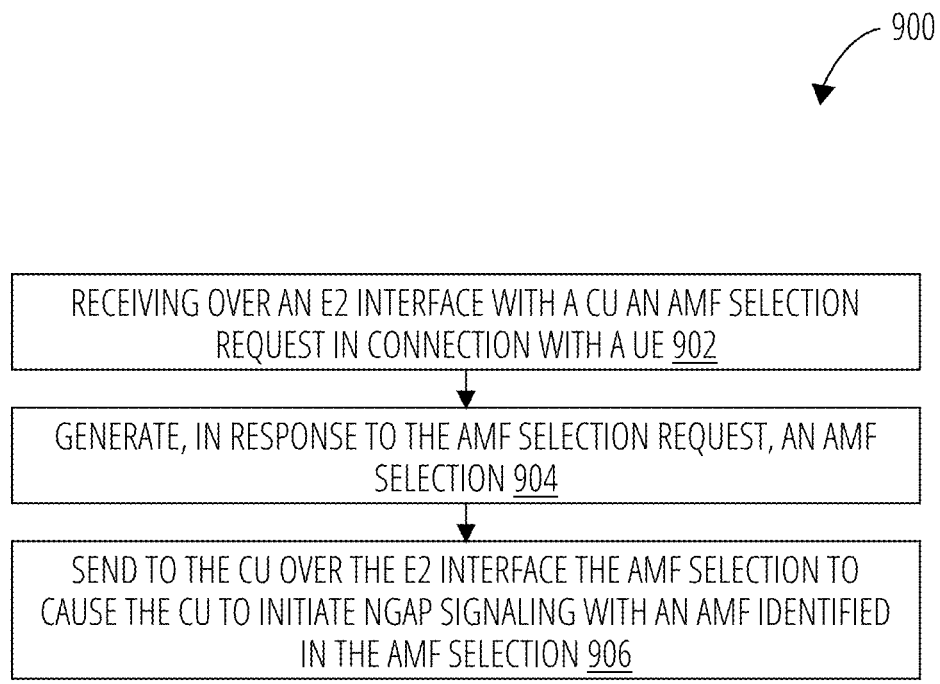
FIG. 9 is a flow chart of a process in accordance with one embodiment.

FIG. 9 shows a process 900, performed by a near-RT RIC, of selecting an AMF for a UE. In block 902, process 900 receives over an E2 interface with a CU an AMF selection request in connection with a UE. In block 904, process 900 generates, in response to the AMF selection request, an AMF selection. In block 906, process 900 sends to the CU over the E2 interface the AMF selection to cause the CU to initiate NGAP signaling with an AMF identified in the AMF selection.

Process 900 may also include receiving in the AMF selection request network parameters including a selected PLMN ID of the UE associated with the AMF selection request.

Process 900 may also include receiving in the AMF selection request network parameters including an NSSAI list of the UE associated with the AMF selection request.

Process 900 may also entail the AMF selection request being included with a UE request and connection parameter.

Process 900 may also entail an insert service for UE request and connection parameter being added in an E2AP: RIC indication message.

Process 900 may also include sending the AMF selection by adding a control action in an E2AP: RIC control request message.

Process 900 may also include the AMF selection having TNL information.

Process 900 may also include receiving over an A1 interface with a non-RT RIC an AMF selection priority policy set.

Process 900 may also include the AMF selection priority policy set being generated in response to input data from system orchestration.

Process 900 may also include the input data having AMF LCM information and a configuration update, topology information, AMF capabilities, congestion status, statistics and failure event information.

Process 900 may also include the AMF selection priority policy set having a service-based capability information derived using input AMF capabilities.

Process 900 may also include the AMF selection priority policy set having geographical-access-restrictions capability information derived using input AMF capabilities.

Process 900 may also include the AMF selection priority policy set having short-message-services delivery topology-based capability information derived using input AMF capabilities.

Process 900 may also include the AMF selection priority policy set having location-based-services delivery topology-based capability information derived using input AMF capabilities.

Process 900 may also include the AMF selection priority policy set having network-exposure-services delivery topology-based capability set derived using input AMF capabilities.

Process 900 may also include the AMF selection priority policy set indicating a uniform distribution of load towards the AMF by considering multiple gNB signaling loads using input statistics, failure, and congestion status.

Process 900 may also include the AMF selection priority policy set having an AMF priority based on optimized cost derived using input network topology.

Process 900 may also include generating of the AMF selection by considering, based on input AMF LCM information and configuration update received from a non-RT RIC in response to instantiation of a dynamically instantiated AMF, the dynamically instantiated AMF and its configuration and capability.

Process 900 may also include the UE being a first UE and the AMF being a first AMF, such that process 700 further includes repeating the receiving, generating, and sending to select a second AMF for a second UE in response to utilization (i.e., over utilization beyond a desired threshold amount) at the first AMF.

Figure 10:
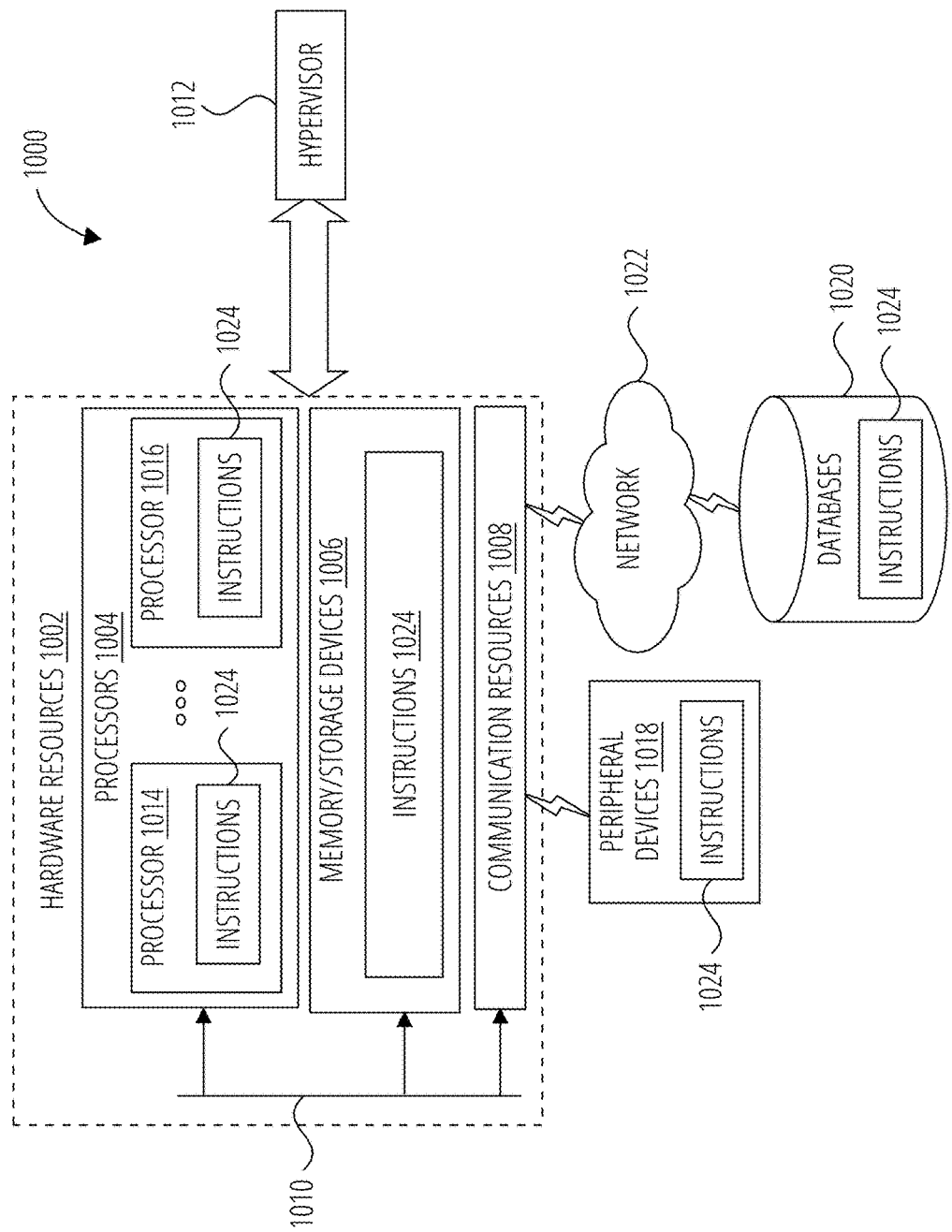
FIG. 10 is a block diagram of computing components for performing the disclosed procedures, in accordance with one embodiment.

FIG. 10 is a block diagram illustrating components 1000, according to some example embodiments, that are able to read instructions from a machine-readable or computer-readable medium (e.g., a non-transitory machine-readable storage medium) and perform any one or more of the methods discussed herein, such as process 700 (FIG. 7), process 800 (FIG. 8A and FIG. 8B), process 900 (FIG. 9), and similar processes or portions thereof.

Specifically, FIG. 10 shows a diagrammatic representation of hardware resources 1002 including one or more processors 1004 (or processor cores), one or more memory/storage devices 1006, and one or more communication resources 1008, each of which may be communicatively coupled via a bus 1010. For embodiments where node virtualization (e.g., NFV) is utilized, a hypervisor 1012 may be executed to provide an execution environment for one or more network slices/sub-slices to utilize hardware resources 1002.

Processors 1004 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1014 and a processor 1016.

Memory/storage devices 1006 may include main memory, disk storage, or any suitable combination thereof. Memory/storage devices 1006 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), flash memory, solid-state storage, etc.

Communication resources 1008 may include interconnection or network interface components or other suitable devices to communicate with one or more peripheral devices 1018 or one or more databases 1020 via a network 1022. For example, communication resources 1008 may include wired communication components (e.g., for coupling via a universal serial Bus (USB)), cellular communication components, NFC components, Bluetooth® components (e.g., Bluetooth® Low Energy), Wi-Fi® components, and other communication components.

Instructions 1024 may comprise software, a program, an application, an applet, an app, or other executable code for causing at least any of processors 1004 to perform any one or more of the methods discussed herein. Instructions 1024 may reside, completely or partially, within at least one of processors 1004 (e.g., within the processor's cache memory), memory/storage devices 1006, or any suitable combination thereof. Furthermore, any portion of instructions 1024 may be transferred to hardware resources 1002 from any combination of peripheral devices 1018 or databases 1020. Accordingly, the memory of processors 1004, memory/storage devices 1006, peripheral devices 1018, and databases 1020 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a near real time radio access network (RAN) intelligent controller (near-RT RIC), of selecting an access and mobility management function (AMF) for a user equipment, the method comprising:
   receiving, by the near-RT RIC over an E2 interface from a central unit (CU), an AMF selection request in connection with a UE that is connecting to a RAN associated with the CU;
   generating, by the near-RT RIC in response to the AMF selection request, an AMF selection based, at least in part, on real-time radio network information; and
   sending, by the near-RT RIC to the CU over the E2 interface, the AMF selection to cause the CU to initiate NG application protocol (NGAP) signaling with an AMF identified in the AMF selection.

2. The method of claim 1, further comprising receiving, in the AMF selection request, network parameters including a selected PLMN ID of the UE associated with the AMF selection request.

3. The method of claim 1, further comprising receiving, in the AMF selection request, network parameters including an NSSAI list of the UE associated with the AMF selection request.

4. The method of claim 1, in which the AMF selection request is included with a UE request and connection parameter.

5. The method of claim 4, in which an insert service for the UE request and connection parameter is added in an E2 application protocol (E2AP):
   RIC indication message.

6. The method of claim 4, further comprising sending the AMF selection by adding a control action in an E2 application protocol (E2AP): RIC control request message.

7. The method of claim 1, in which the AMF selection includes transport network layer (TNL) information.

8. The method of claim 1, further comprising receiving over an A1 interface with a non-RT RIC an AMF selection priority policy set.

9. The method of claim 8, in which the AMF selection priority policy set is generated in response to input data from system orchestration.

10. The method of claim 9, in which the input data includes AMF lifecycle management (LCM) information and configuration update, topology information, AMF capabilities, congestion status, statistics and failure event information.

11. The method of claim 10, in which the AMF selection priority policy set includes a service-based capability information derived using input AMF capabilities.

12. The method of claim 10, in which the AMF selection priority policy set includes geographical-access-restrictions capability information derived using input AMF capabilities.

13. The method of claim 10, in which the AMF selection priority policy set includes short-message-services delivery topology-based capability information derived using input AMF capabilities.

14. The method of claim 10, in which the AMF selection priority policy set includes location-based-services delivery topology-based capability information derived using input AMF capabilities.

15. The method of claim 10, in which the AMF selection priority policy set includes network-exposure-services delivery topology-based capability set derived using input AMF capabilities.

16. The method of claim 9, in which the AMF selection priority policy set indicates a uniform distribution of load towards the AMF by considering multiple gNB signaling loads using input statistics, failure, and congestion status.

17. The method of claim 9, in which the AMF selection priority policy set includes an AMF priority based on optimized cost derived using input network topology.

18. The method of claim 9, in which the generating of the AMF selection includes considering, based on input AMF lifecycle management (LCM) information and configuration update received from a non-RT RIC in response to instantiation of a dynamically instantiated AMF, the dynamically instantiated AMF and its configuration and capability.

19. The method of claim 1, in which the UE is a first UE and the AMF is a first AMF, and further comprising repeating the receiving, generating, and sending to select a second AMF for a second UE in response to utilization at the first AMF.

* * * * *